June 15, 1965   E. H. WRENCH   3,188,912
OPTICAL PANEL
Filed June 6, 1960

INVENTOR.
EDWIN H. WRENCH
BY *Schmidt, Mattingly & Huntley*
ATTORNEYS

3,188,912
OPTICAL PANEL
Edwin H. Wrench, San Diego, Calif.
(411 Archer St., La Jolla, Calif.)
Filed June 6, 1960, Ser. No. 34,119
1 Claim. (Cl. 88—60)

The present invention relates to an optical panel and more particularly relates to an optical panel having a chamber or chambers therein which when filled with a light refractive liquid operates to reflect light, but which is transparent to light when the liquid is removed.

The present optical panel is intended for use as a structural part of a roof or an outer wall for a home, for example, and is operative to reflect the rays of the sun to reduce the amount of light and heat transmitted by the panel. This is particularly a problem in roofs and in southern wall exposures. The panel is also operative to pass the rays of the sun when the accompanying light and heat is desired in the home. Thus, the present optical panel is characterized by the ability to pass light and heat according to the particular demands of the moment, insulating the home from the midday sun when desired.

More particularly, the optical panel includes means which are formed to provide one or more longitudinally extending chambers, each of which has a transparent outer or upper wall portion and a transparent inner or lower wall portion. Preferably, a plurality of these wall portions are joined at their edges in an integral construction to provide a plurality of adjacent chambers. The ends of these chambers are sealed by cap members, the cap members being spaced from the associated end of the panel to provide manifold spaces. Reflective material, preferably a plurality of longitudinally extending strips, are arranged adjacent the inner wall portions of the various chambers, and means are provided for introducing a light refractive liquid such as water into the manifold space, and thence into the chambers. A suitable vent is provided in one of the manifold spaces of the panel to permit venting for draining and filling of the panel.

The outer or upper and inner or lower wall portions are each configured or formed to act as a lens when the chambers are filled with liquid whereby light intercepted by the outer wall portions is focused toward the reflective strips. That is, the shape of the wall portions produces a chamber which in cross section has a double-convex or biconvex configuration so that the contained liquid is in the form of a lens for focusing light rays of the sun against the reflective material.

With this arrangement, the present optical panel is adapted to permit light and heat to pass through the panel when the chambers are empty of liquid, but which are also adapted to reflect light rays when the chambers are filled with liquid. The light reflective material may be either attached to the lower wall portions or arranged closely adjacent thereto. Further, the panel is preferably arranged so that the longitudinally extending panel is substantially aligned with the apparent path of the sun across the sky, and since the sun will be at an angle to the panel during most of the year, the reflective strips are preferably arranged out of alignment with the line of focus of the lens shaped chambers. That is, the greater portion of the width of the reflective strip is arranged to one side of this line of focus so that the majority of the intercepted light is reflected outwardly when the chambers are filled with the light refracted liquid.

In another embodiment of the present invention, the outer and inner wall portions are formed to provide a cross section of circular configuration, and the reflective material is applied to the lower wall portion. This embodiment is not as efficient as the above described biconvex configuration, but it is somewhat more inexpensive to manufacture.

Apparatus is provided to introduce the refractive liquid into the chambers, and this apparatus is conveniently operated by the water pressure of the usual city mains.

Other objects and features of the present invention will be readily apparent to those skilled in the art from the following specification and appended drawings wherein is illustrated a preferred form of the invention, and in which.

Figure 1:
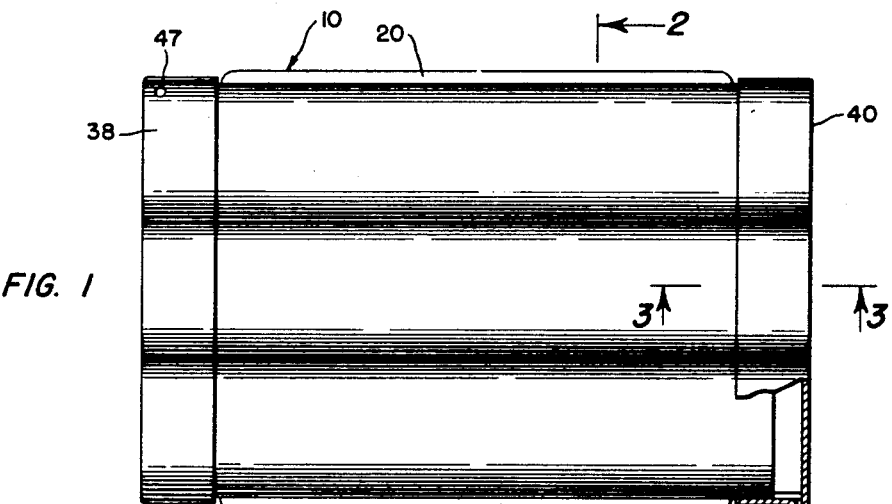
FIGURE 1 is a plan view of the present optical panel in combination with apparatus for introducing refractive liquid into the panel, a portion of the panel being cut away for clarity, and the apparatus for introducing liquid being shown in partially schematic or diagrammatic form.
Figure 2:
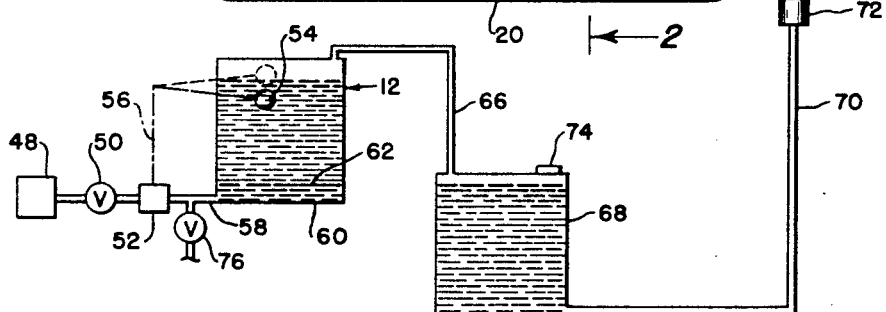
FIGURE 2 is a view taken along line 2—2 of FIGURE 1.
Figure 2:
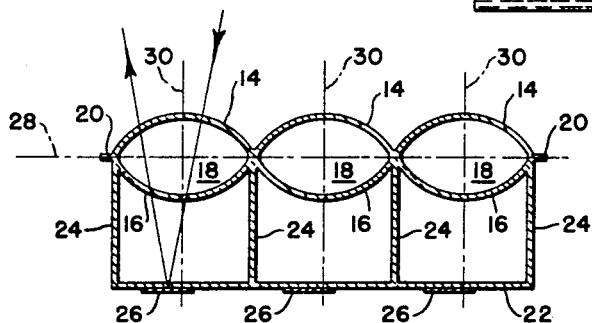
Figure 3:
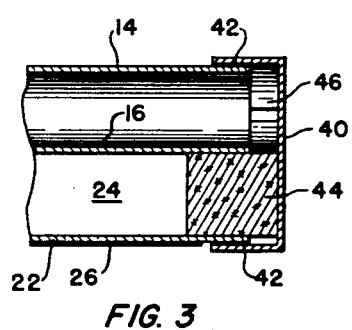
FIGURE 3 is a view taken along line 3—3 of FIGURE 1.

Referring now to the drawings, and particularly FIGURES 1 through 3, there is illustrated an optical panel 10 in combination with means or apparatus 12 for introducing light refractive liquid into the optical panel 10.

Panel 10 comprises, generally, a plurality of outer wall portions, herein shown as upper wall portions 14, FIGURE 2, and a plurality of inner wall portions, herein shown as lower wall portions 16. As illustrated, wall portions 14 and 16 are preferably formed to extend longitudinally to provide a plurality of longitudinally extending chambers 18. The material of wall portions 14 and 16 is transparent or optically clear, and is conveniently made of glass. The glass wall portions 14 and 16 are edge connected at their point of adjacency, and the outermost wall portions are extended laterally to provide a lip or flange 20 for attaching a similar optical panel to provide a plurality of panels over the width of opening within which the present optical panel system is to be installed. Flanges 20 are also useful in affording a means for connecting the optical panel to adjacent structural portions of the building within which the present panel is installed.

A lower plate 22 of clear or translucent material, such as glass, is spaced below lower wall portions 16, and is supported in this spaced relation by a plurality of vertically extending walls 24 which are joined at their upper edges to the edges of wall portions 16. The construction and arrangement of wall portions 14 and 16, plate 22, and walls 24 is such that the assembly can be made integral and manufactured inexpensively by the extrusion process.

Strips of light reflective material 26 are conveniently applied, as by painting or the like, to the underside of plate 22. These strips 26 may be silvered and deposited directly upon the glass by the electrolysis process, or reflective aluminum paint or the like may be used, however, it is preferred that strips 26 provide a silvered surface for the reflection of light rays passing through the transparent wall portions 14 and 16.

For optimum optical properties the biconvex configuration of each chamber 18 is 10 units thick at the center, and the width of the lens is about 17 units. The radius of curvature of both the upper and lower wall portions 14 and 16 is approximately 10 units, and the focal plane, that is strips 26, is located approximately 17 units from the horizontal center line 28 of chambers 18.

Each silvered strip 26 is approximately 35% of the width of each chamber 18, with approximately 30% of the width of each strip 26 being located to one side of the vertical center line 30 and the remaining 5% of the width of the strip 26 being located on the other side of center line 30.

This location of strips 26 is designed to focus the maximum amount of incoming light upon strips 26. That is, panel 10 is preferably oriented in an east-west direction in substantial alignment with the apparent path of the sun across the sky, and since the sun is not directly overhead but rather at an angle during the substantial portion of the year, the slanting rays of the sun will be reflected upon strips 26 when chambers 18 are filled with liquid.

Figure 4:
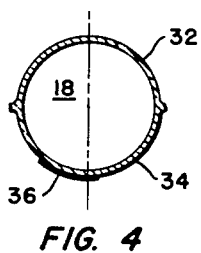
FIGURE 4 is a cross section of another embodiment of the panel, illustrating a circularly shaped arrangement of upper and lower wall portions.

Another form or configuration for chamber 18 is provided, as seen in FIGURE 4, by an upper wall portion 32 and a lower wall portion 34 which provide a cylindrical chamber 18 of circular cross section. The lens or focusing effect of this arrangement is not as efficient as the arrangement illustrated in FIGURE 2, but the structure is more inexpensive to manufacture and may have application in a variety of situations. It is noted that the silvered strip 36 is applied directly to the outer surface of lower wall portion 34, and this silvered strip 36 covers approximately 47 degrees of the circumference of the circular shape shown, about 7 degrees of strip 36 being on one side of the vertical centerline, and the balance being on the other side of the centerline.

Referring now to FIGURES 1 and 3, a pair of end caps 38 and 40 are provided to cap or manifold the open ends of the chambers 18, and the open ends of the passages formed by wall 24, plate 22, and wall portions 16. Each end cap 38 or 40 is shaped to conform to the shape of upper wall portions 14 and plate 22, being adhered thereto by a sealant 42 such as solder or rubber adhesive. A plug 44 made of any suitable material, such as cork or the like, is inserted in the ends of each of the passages beneath wall portions 16 to block the flow of any liquid into these passages, and end caps 38 and 40 are spaced from the ends of wall portions 14 and 16 to provide manifold passages 46 (only one of which is illustrated in FIGURE 3). A refractive liquid such as water is introduced into manifold 46, and thence into chambers 18, a vent 47, FIGURE 1, being provided to permit the filling of chambers 18.

The means 12 for introducing the refractive liquid into panel 10 comprises, generally, a source 48 of water under pressure, such as a city water main. An inlet valve 50 is connected to source 48 and is operated to route water to a valve 52 which is controlled by a float 54 connected by any suitable means 56 to the valve 52. When valve 52 is open, water flows through a conduit 58 into a tank 60, the level of the water in tank 60 being at 62 when chambers 18 are empty. A body of oil or the like floats upon the water in tank 60, as illustrated. Tank 60 is connected by a conduit 66 to a tank 68, and tank 68 is in turn connected by a conduit 70 to end cap 40 by any suitable coupling 72. The body of oil completely fills the space above level 62, the space within conduit 66, and the space above the water level in tank 68.

When it is desired to fill chambers 18 of panel 10, valve 50 is opened, and with float 54 in the position illustrated the valve 52 is also open so that water flows into tank 60. The rising water level 62 causes the body of oil to depress the level of water in tank 68, forcing the water in tank 68 into chambers 18. When water level 62 reaches a predetermined height, float 54 is buoyed up, and valve 52 is shut off. At this predetermined height chambers 18 are full. It is noted that float 54 is of neutral or slightly less than neutral buoyancy in the oil, and is buoyed up only when water level 62 reaches it.

The liquid in tank 68 is preferably a mixture of copper sulphate and water to prevent the formation of algae in chambers 18. A filler cap 74 is provided to enable the water in the copper sulphate mixture to be replenished as needed.

The water in chambers 18 is drained by opening a drain valve 76, the force of gravity being utilized to achieve the necessary head for draining the water.

The present optical panel 10 may thus be used as an integral structural part of a building roof, for example, to thereby control the amount of sunlight and consequently heat admitted to the building. Since wall portions 14 and 16 are transparent, maximum light transmission is had when chambers 18 are empty, but with chambers 18 filled with water or similar liquid, a substantial portion of the incoming light rays are focused upon strips 26 for reflection away from the interior of the building.

The index of refraction for the liquid of the embodiment of FIGURE 2 is preferably approximately 1.33, and for that of FIGURE 4, approximately 1.5.

While certain preferred embodiments of the invention have been specifically disclosed, it is understood that the invention is not limited thereto as many variations will be readily apparent to those skilled in the art and the invention is to be given its broadest possible interpretation within the terms of the following claim.

I claim:

An optical panel comprising a plurality of edge-connected, longitudinally extending, hollow, transparent tubular chambers and a transparent plate having a like plurality of reflective strips thereon, said plate being parallel and coextensive with said panel of tubular chambers, each of said chambers having a wall formed into convex configuration; a pair of means at opposite ends of said chambers forming a pair of manifolds, respectively; means for introducing a light refractive liquid into at least one of said manifolds to supply said chambers with said liquid whereby said chambers focus light rays, the focus line being parallel to the longitudinal axes of the chambers, said transparent plate being located on the focal side of the tubes, and the plurality of strips of light reflecting material extending longitudinally of said chambers coincident with the focus lines, each of said strips being longitudinally aligned, respectively, with a focus of sun's direct rays emanating from a chamber when the chamber contains said liquid, said strips being spaced laterally of one another.

References Cited by the Examiner

UNITED STATES PATENTS

| | | | |
|---|---|---|---|
| 719,066 | 1/03 | Wadsworth | 88—60 |
| 1,150,374 | 8/15 | Kanolt | 88—1 |
| 1,195,757 | 8/16 | Wertz | 88—57 |
| 1,532,995 | 4/25 | Gage | 88—14 |
| 1,811,946 | 6/31 | Le Bailly | 73—293 |
| 2,411,986 | 12/46 | Cowherd | 88—14 |
| 2,489,751 | 11/49 | Candler | 88—61 |
| 2,783,682 | 3/57 | Swenson | 88—60 |
| 2,888,007 | 5/59 | Tabor | 88—60 X |
| 2,951,419 | 9/60 | Lemelson | 88—1 |
| 2,980,802 | 4/61 | Bracey et al. | 88—14 X |

FOREIGN PATENTS

| | | |
|---|---|---|
| 556,218 | 9/43 | Great Britain. |
| 546,444 | 7/56 | Italy. |

JULIA E. COINER, *Primary Examiner.*

EMIL G. ANDERSON, NORTON ANSHER, *Examiners.*